United States Patent [19]
Hart, Jr.

[11] 3,751,649
[45] Aug. 7, 1973

[54] MEMORY SYSTEM EXERCISER

[75] Inventor: Thomas William Hart, Jr., Phoenix, Ariz.

[73] Assignee: Macrodata Company, Chatsworth, Calif.

[22] Filed: May 17, 1971

[21] Appl. No.: 143,784

[52] U.S. Cl. .......................... 235/153 AC, 324/73 A
[51] Int. Cl. ......................... G11c 29/00, G06f 11/04
[58] Field of Search .................. 235/153; 340/172.5; 324/73 R

[56] References Cited

UNITED STATES PATENTS

| | | | |
|---|---|---|---|
| 3,519,808 | 7/1970 | Lawder | 235/153 |
| 3,579,199 | 5/1971 | Anderson | 340/172.5 |
| 3,311,890 | 3/1967 | Waaben | 340/172.5 |
| 3,546,582 | 12/1970 | Barnard et al. | 324/73 |
| 3,219,927 | 11/1965 | Topp, Jr. et al. | 324/73 |
| 3,633,100 | 1/1972 | Heilweil | 324/73 |
| 3,581,074 | 5/1971 | Waltz | 235/153 |
| 3,631,229 | 12/1971 | Bens | 235/153 |
| 3,633,174 | 1/1972 | Griffin | 235/153 |

*Primary Examiner*—Charles E. Atkinson
*Attorney*—Flam & Flam

[57] ABSTRACT

Memory systems are tested using an exerciser in which stored program instructions direct data generation, memory addressing, read/write operation and data or address comparison. For data generation, a test word register (the T-register) contains a word to be written into the memory under test at an address stored in an address register (the A-register). The T-register contents can be modified, interchanged with a background word register (the B-register), shifted or used for pseudo-random sequence generation. Data read from the memory under test is placed in a memory register (the M-register) for comparison with the contents of the T-register. Certain stored program instructions are conditioned by the results of this data comparison. The A-register contents can be modified, stored in a pointer register (the X-register), or compared with the pointer address or with another address indicative of the memory size. Other program instructions are conditioned by the results of such address comparison. Typical memory test programs, including "galloping" and "walking" data routines and random sequence routines, illustrate operation of the memory system exerciser. The exerciser can be used independently or as a component in a larger test system.

43 Claims, 12 Drawing Figures

INVENTOR.
THOMAS W. HART
BY
Flam & Flam
ATTORNEYS

INVENTOR.
THOMAS W. HART

BY

Flam & Flam

ATTORNEYS

INVENTOR.
THOMAS W. HART
BY
Flam & Flam
ATTORNEYS

INVENTOR
THOMAS W. HART
BY
Flam & Flam
ATTORNEYS

INVENTOR.
THOMAS W. HART
BY
Flam & Flam
ATTORNEYS

INVENTOR.
THOMAS W. HART
BY
Flam & Flam
ATTORNEYS

INVENTOR.
THOMAS W. HART
BY
Flam & Flam
ATTORNEYS

INVENTOR.
THOMAS W. HART
BY
Flam & Flam
ATTORNEYS

INVENTOR.
THOMAS W. HART
BY
Flam & Flam
ATTORNEYS

MEMORY SYSTEM EXERCISER

BACKGROUND OF THE INVENTION

1. Field of the Invention

The present invention relates to a memory system exerciser. More particularly, the invention relates to memory test apparatus wherein data generation and memory addressing each are controlled by a processor executing a set of special purpose instructions defining a memory test program.

2. Description of the Prior Art

Semiconductor memories now are incorporated in a wide variety of electronic equipment. Such memories typically include numerous integrated circuit memory cells, each storing a binary one or zero, organized in an array or matrix. A group of i cells form a word of length i, identified by a unique address. If the lowest memory address is G and the highest address is N, the size or number of words in the memory is N–G+1.

Data generally is entered into a semiconductor memory a word at a time, by providing to the memory the data to be written together with appropriate address and write control signals. Subsequently, data readout is enabled by supplying address and read control signals to the memory. If the memory is functioning properly, the word accessed from a particular data storage location will be identical to the data previously entered at that address. An error occurs whenever the data read from the memory differs from that previously written to the same address.

Various failure modes are associated with semiconductor memories. For example, conductors in the memory array may be open or short circuited. Transistors or other components may be inoperative. Such catastrophic failures are relatively east to detect. Other failure modes result in more elusive errors. For example, leakage current from bipolar tansistors to a common sense line may result in readout of a binary one or zero, where the opposite bit actually was stored. Erroneous readout may occur only when certain data combinations are stored in the memory, and not when other data configurations are present. A noise problem may result from improper topological design.

In certain other semiconductor memories, such as that described in conjunction with FIG. 2 below, leakage current to a common sense/digit line may charge the effective input capacitance of the sense amplifier associated with that line. When data next is entered via the sense/digit line, the data driver output must overcome this residual charge. If this cannot be accomplished sufficiently fast, the new data may be entered erroneously. Since the residual charge level is effected by the data configuration stored in the memory, transient performance of the memory may be pattern and sequence dependent.

Other failure modes involve erroneous memory addressing. Thus, incorrect wiring of a memory system or errors in the address decoding logic included in certain semiconductor memories, may cause the correct data to be entered at an incorrect location. In another failure mode, a data word may be entered into two or more storage locations, even though a single address was supplied to the memory.

To test completely such semiconductor memories requires apparatus capable of exercising a memory system under a variety of data and address configurations. For example, it is not sufficient merely to enter a test word at each location, and subsequently read back each stored word for comparison with the word entered. Such an exercise would not expose errors which are data pattern or sequence dependent. Moreover, if the same test word were entered at all memory locations, subsequent readout would not expose an error in addressing, or the erroneous entry of the same word into more than one storage location.

The programmable memory system exerciser disclosed herein has the flexibility required to expose memory failures even though they are address or data dependent. The exerciser can test each bit in the memory array, and will detect errors due to interaction between bits, or where the memory transient performance is dependent on data pattern and/or sequence. The memory system exerciser operates at speeds commensurate with normal operation of the memory under test. Provision is made for refreshing destructive readout memories, and for testing read only memories.

The inventive memory system exerciser is capable of testing any type of memory system or component, from a single cell storing one binary bit to a complex system storing many thousands of multiple-bit words. Semiconductor, core, ceramic or other types of memories, including shift registers, can be tested. The memory system exerciser may be operated as an independent entity, or part of an overall test system.

SUMMARY OF THE INVENTION

In accordance with the present invention, there is provided a memory system exerciser in which stored program instructions direct data generation, memory addressing, read/write operation and data or address comparison. The exerciser includes a data generation section which provides data to be written to the memory under test. An address generation section identifies the memory storage location for entry or readout. A command and control section interprets stored program instructions and directs all functions of the data and address generation sections.

In a preferred embodiment, the data generation section includes a test word register (the T-register) which stores data to be written to the memory under test. Under program control, the contents of the T-register can be modified, shifted, interchanged with the contents of a background word register (the B-register), or used for pseudo-random sequence generation. A memory register (the M-register) receives data read from the memory under test. A data comparator compares the contents of the T- and M-registers, and provides a data comparison signal to the control section indicative of the results of such comparison. To provide flexibility in word length, an inhibit register (the I-register) inhibits comparison of selected bits in the T- and M-register words.

The address generation section includes an address register (the A-register) which contains the address of the memory storage location to which data is written or from which data is read. Under program control, the contents of the A register can be modified, incremented, decremented, or stored in a different register (the X-register) for use as an address pointer. Another pair of registers (the G-register and the N-register) respectively store the lowest and highest memory addresses; these registers thus define the size of the memory under test. The address in the A-register can be compared with the highest memory address (in the N-register) or with the pointer address (in the X-register) by means of an address comparator. An address comparison signal is provided to the control section to indicate the results of such comparison.

The control section comprises a stored program memory containing sets of instructions defining the memory test routines. Program registers direct access of instructions from the stored program memory, and are used during execution of subroutines and indexed instructions. Program control logic interprets the accessed instructions, and provides appropriate signals to the data and address generation sections to direct performance of each instruction. Certain branch instructions are conditioned by the status of the data comparison and address comparison signals.

To customize the exerciser for use with a particular memory system, provision is made for use of a "personality card". Such card permits programmed selection of cycle time, logic levels and other parameters associated with the particular memory under test.

Thus it is an object of the present invention to provide a memory system exerciser wherein complete system flexibility is provided by the use of independent data generation means and address generation means functioning under program control.

BRIEF DESCRIPTION OF THE DRAWINGS

Detailed description of the invention will be made with reference to the accompanying drawings wherein like numerals designate like parts in the several figures.

DESCRIPTION OF THE PREFERRED EMBODIMENTS

The following detailed description is of the best presently contemplated modes of carrying out the invention. This description is not to be taken in a limiting sense but is made merely for the purpose of illustrating the general principles of the invention since the scope of the invention best is defined by the appended claims. Operational characteristics attributed to forms of the invention first described also shall be attributed to forms later described unless such characteristics obviously are inapplicable or unless specific exception is made.

Figure 1:
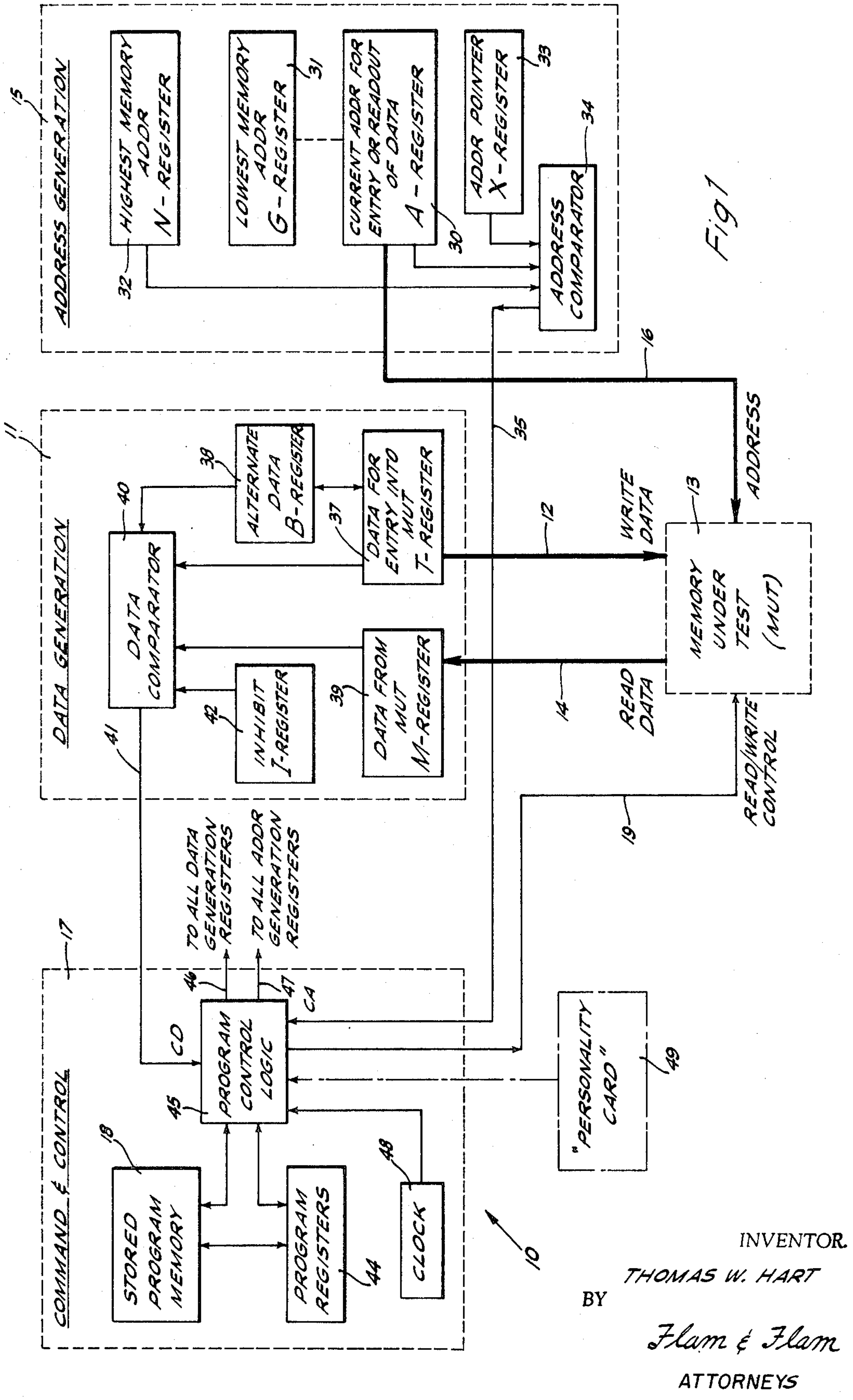
FIG. 1 is a simplified block diagram of the inventive memory system exerciser.

Referring now to the drawings, and particularly to FIG. 1 thereof, there is shown a memory system exerciser 10 in accordance with the present invention. The exerciser 10 includes a data generation section 11 which provides data to be written via a line 12 to a memory 13 under test (MUT), and which receives via a line 14 data read back from the memory 13. An address generation section 15 provides via a line 16 an address signal to the memory 13 under test,identifying the data storage location to which data is written or from which data is read. A command and control section 17 directs operation of the data generation section 11 and the address generation section 15 in response to instructions contained in a stored program memory 18. The control section 17 also provides read and write control signals via a line 19 to the memory 13 under test.

Figures 2, 5B, 6:
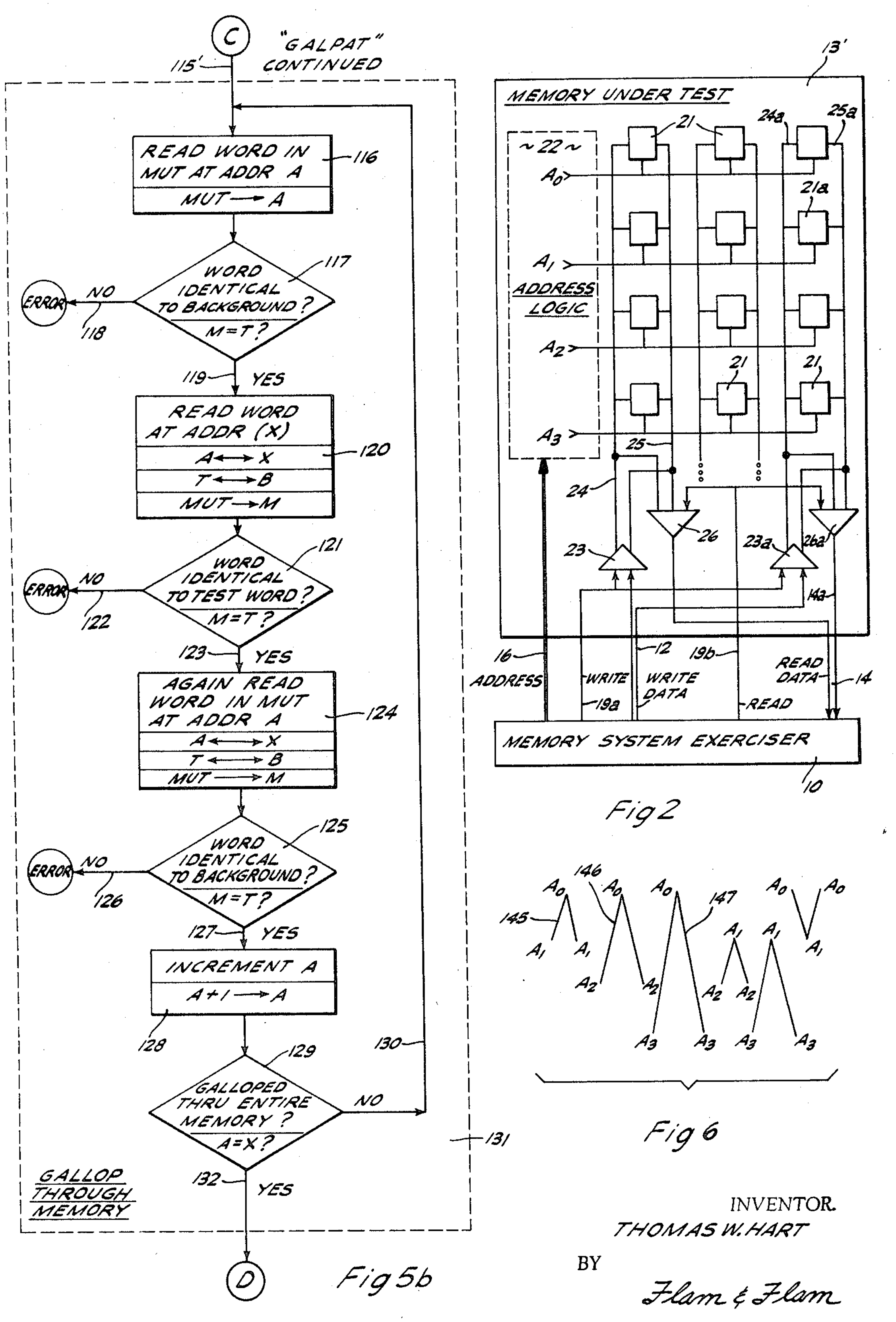
FIG. 2 is a simplified block diagram of the inventive memory system exerciser interfacing a memory under test.
FIGS. 5*a*, 5*b* and 5*c* together comprise a flow chart of the galloping pattern "GALPAT" memory test program which may be performed by the exerciser of FIG. 1.
FIG. 6 is a diagram showing the order of memory readout followed by the "GALPAT" program.

The memory system exerciser 10 may be used to test a semiconductor memory 13' such as that shown in FIG. 2. The memory 13' includes 12 memory cells 21 arranged to store four words each three bits in length. An address, herein $A_0$, $A_1$, $A_2$ and $A_3$, is associated with each such word. The memory 13' contains address logic 22 which decodes the address signal received via the line 16 from the exerciser 10, and in response thereto energizes the corresponding one of the word enable lines designated $A_0$ through $A_3$.

To enter data in the memory 13', the exerciser 10 provides a write control signal via the line **19*a* which enables the data drivers 23. Simultaneously, the write data is provided to the drivers 23 via the parallel lines 12. Each data driver 23 then provides a voltage on one or the other of a pair of sense/digit lines 24, 25 depending on whether a binary zero or a binary one has been provided to that data driver. Each data driver 23 is associated with a corresponding cell in every memory word. Thus the voltage on the line 24 or 25 will set to zero or one the corresponding memory cell in the enabled word. For example, if a binary zero is provided to the data driver 23a, a voltage will occur on the line 24*a* which will set to zero the memory cell 21*a* to the enabled word $A_1$ addressed by the signal on the line 16**.

To read data from the memory 13', the exerciser 10 provides a read control signal via the line **19*b* to enable the sense amplifiers 26. Each memory cell 21 in the addressed word will provide a current on one or the other of the sense/digit lines 24, 25 depending on whether the binary zero or one has been stored therein. Each sense amplifier 26 will provide via a corresponding one of the lines 14 a binary zero or binary one depending on whether current is sensed in the respective line 24 or 25. In the example noted above, when the word $A_1$ is read out, presence of a current on the line 24*a*, and no current on the line 25*a* will indicate to the sense amplifier 26 that a binary zero has been stored. Accordingly, a signal indicative of a binary zero will be sent back to the exerciser 10 via the line 14*a***.

Referring again to FIG. 1, the address generation section 15 includes an address or A-register 30 which stores the current address for entry or read out of data. The address signal supplied via the line 16 to the memory 13 under test corresponds to the address stored in the A-register. As described below in conjunction with FIG. 3, the contents of the A-register can be incremented, decremented and otherwise modified under control of instructions contained in the stored program memory 18. Thus, e.g., by incrementing the contents of the A-register, data can be entered into successive locations or words of the memory 13 under test.

The lowest address and highest address of the memory under test may be stored respectively in a G-register 31 and an N-register 32 contained within the address generation section 15. For example, when testing the memory 13' of FIG. 2, the G-register would contain the lowest address $A_0$, and the N-register 32 would contain the highest address $A_3$. An X-register 33 is provided to store a pointer address identifying a specific word in the memory under test. For example, a test word may be entered in only a single memory location, and a different, background word, entered in other memory locations. The X-register 33 may be used to store the address identifying the test word location.

As certain test routines are performed, it may be desirable to compare the current address in the A-register with either the address pointer in the X-register 33 or with the highest memory address in the N-register 32. Such comparison is facilitated by an address comparator 34 which provides via a line 35 to the control section 17 an address comparison signal (CA) indicative of the results of such comparison. The address comparison signal is used to condition certain instructions executed by the control section 17. For example, a program incrementing the A-register 30 may terminate when the address in the A-register 30 equals the highest memory address stored in the N-register 32.

The data generation section 11 (FIG. 1) includes a T-register 37 which stores the data word to be entered via the line 12 into the memory 13 under test. The contents of the T-register can be modified, shifted, interchanged with another data word stored in a B-register 38, or used for pseudo-random sequence generation, all under control of instructions contained in the stored program memory 18.

Data read from the memory 13 under test is received in an M-register 39 contained in the data generation section 11. A data comparator 40 facilitates comparison of the contents of the T-register 37 and the M-register 39, and provides via a line 41 to the control section 17 a data comparison (CD) signal indicative of the results of such comparison. Typically, the data comparator 40 is used to determine whether a word read from a specific address of the memory 13 under test is identical to the data previously written to that address. Certain instructions executed by the control section 17 are conditioned by the data comparison signal.

The length or number of bits in the word stored by the T-register 37 or M-register 39 may be larger than the word length of the memory 13 under test. For example, the T-register 37 and M-register 39 may be capable of storing a word 16 bits in length, while the memory 13' (FIG. 2) under test may have a word length of only three bits. To accommodate such difference in word length, the data generation section 11 is provided with an I-register 42 which inhibits comparison by the data comparator 40 of specified data bits. In the example just mentioned, the I-register may inhibit comparison of the unused 13 bits of the T- and M-registers 37, 39.

The command and control section 17 (FIG. 1) is used to direct all operations in the data generation section 11 and the address generation section 15, in response to instructions (described below) contained in the stored program memory 18. A set of program registers 44, described below in conjunction with FIG. 4, direct accessing of instructions from the memory 18, and are used in conjunction with reentry from subroutines and execution of indexed instructions. Program control logic 45 interprets the instructions read from the memory 18,and commands execution of the instructions by transmitting appropriate signals via the lines 46 and 47 to the registers in the data and address generation sections 11 and 15. A clock 48 establishes system timing and controls certain sequencing of the memory 13 read and write operations.

For added system flexibility, a "personality card" 49 may be utilized in conjunction with the program control logic 45. For example, circuitry on the "personality card" 49 may select the appropriate clock rate commensurate with the specific memory 13 under test. Similarly, the "personality card" 49 may establish the particular read and write data voltage levels to be used with the memory 13 under test.

Instructions are stored in the memory 18 (FIG. 1) as 24 bit micro-instruction words. The 16 bits designated Z0 through Z15 specify the instruction, and the eight bits designated Z16 through Z23 specify a jump address or index. The instruction bits Z0, Z1, Z2 and Z3 control operation of the address generation section 15 (FIG. 1). The bits Z4, Z5, Z6 and Z7 control operations of the data generation section 11. The bits Z8 through Z12 are used for command and control, and the bits Z13, Z14 and Z15 initiate memory read and write commands.

The following Table I lists the address generation instructions.

TABLE I

| OP CODE Z3 | Z2 | Z1 | Z0 | ACTION | INSTRUCTION |
|---|---|---|---|---|---|
| | 0 | 0 | 0 | A → A | Hold Address |
| | 0 | 0 | 1 | $\bar{A}$ → A | Complement Address |
| | 0 | 1 | 0 | G → A | Set Address to Lowest Location |
| | 0 | 1 | 1 | X → A | Set Address to Pointer "X" |
| | 1 | 0 | 0 | A+1 → A | Increment Address |
| | 1 | 0 | 1 | A*2 → A | Shift Address Left |
| | 1 | 1 | 0 | N → A | Set Address to Highest Location |
| | 1 | 1 | 1 | A–1 → A | Decrement Address |
| 0 | | | | X → X | Hold Pointer "X" |
| 1 | | | | A → X | Save Address in Pointer "X" |

Figure 3:
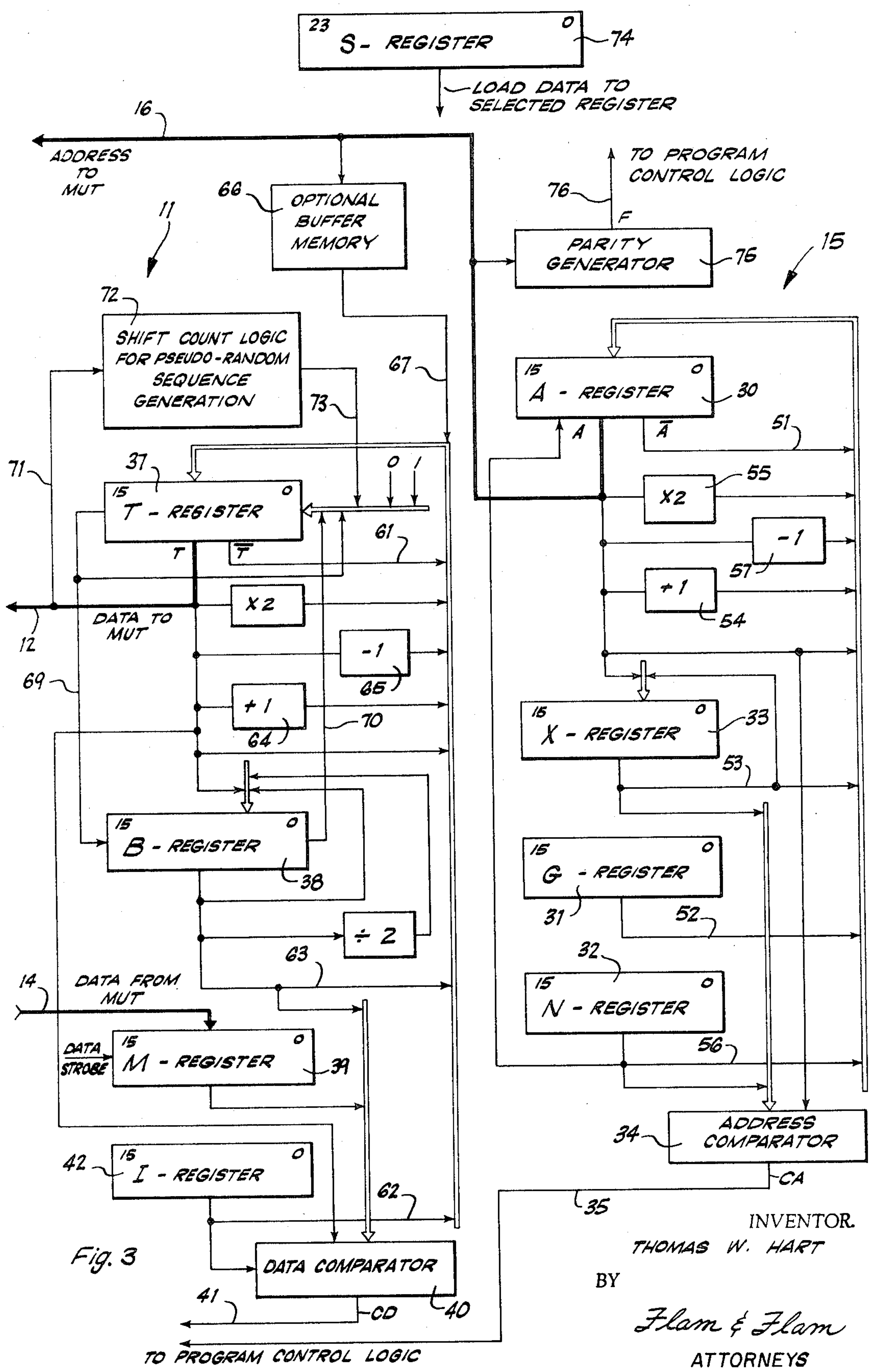
FIG. 3 is a block diagram of the data generation and address generation sections of the memory system exerciser of FIG. 1.

The operation of each address generation instruction listed in Table I above is described in conjunction with FIG. 3, wherein the programmable interconnections between the various address generation section 15 registers are shown.

The A → A instruction leaves unaltered the contents of the A-register 30 unchanged. The $\bar{A}$ → A instruction closes the path 51 so as to replace the contents A of the A-register 30 with the complement $\bar{A}$. The instruction G → A enables the path 52, causing the contents of the G-register 31 (the lowest memory address) to be placed into the A-register 30. The X → A instruction completes the path 53 so as to load the A-register 30 with the pointer address stored in the X-register 33.

The A+1 → A instruction increments the address. This is accomplished by using the circuit 54 to add one to the contents of the A-register 30, the sum being replaced into the A-register. The A*2 → A instruction left shifts the contents of the A-register 30 by one bit position; as indicated by the enabled circuit 55, this operation effectively multiplies by two the contents of the A-register. The N → A instruction completes the path 56 so as to enter the contents of the N-register 32 (the highest memory address) into the A-register 30. The A-1 → A instruction completes the path 57 through a subtract one circuit so as to decrement the address in the A-register.

The X → X instruction maintains unchanged the pointer address stored in the X-register 33. The A → X instruction causes the address in the A-register 30 to be entered into the X-register 33 as a new pointer. The same instruction word which commands the A → X operation also may command another operation on the A-register. For example, if the instruction bits Z3, Z2, Z1, Z0 have the configuration 1010, the contents of the A-register 30 will be stored in the X-register 33 and the contents of the G-register 31 will be loaded into the A-register 30.

The following Table II lists the various data generation instructions:

TABLE II

| Z7 | OP CODE Z6 | Z5 | Z4 | ACTION | INSTRUCTION |
|---|---|---|---|---|---|
| | 0 | 0 | 0 | T → T | Hold the test data |
| | 0 | 0 | 1 | $\overline{T}$ → T | Complement the test data |
| | 0 | 1 | 0 | I → T | Load "T" with the "I" contents |
| | 0 | 1 | 1 | B → T | Load "T" with the "B" contents |
| | 1 | 0 | 0 | T+1 → I | Increment the test data |
| | 1 | 0 | 1 | T*2 → T | Shift Left the Testword |
| | 1 | 1 | 0 | EXT → T | Load External Data into Testword |
| | 1 | 1 | 1 | T − 1 → T | Decrement the Test Data |
| 0 | | | | B → B | Hold the "B" Contents |
| 1 | | | | T → B | Save "T" in "B" |

Each instruction in Table II is described in conjunction with FIG. 3, which shows the programmable interconnections within the data generation section 11.

The T → T instruction maintains unchanged the contents of the T-register 37. The $\overline{T}$ → T instruction completes the path 61 so as to replace the contents T of the T-register 37 with the complement $\overline{T}$ thereof. The I → T instruction loads the contents of the I-register 42 via the path 62 into the T-register 37. The B → T instruction loads the contents of the B-register 38 via the path 63 into the T-register 37.

The T+1 → T instruction completes the path through the add one circuit 64 so as to increment the contents of the T-register 37. The T−1 → T instruction decrements the T-register 37 contents by completing a path through the subtract one circuit 65.

The EXT → T instruction is used in conjunction with the testing of a read only memory. In such instance, an optional buffer memory 66 (FIG. 3) is loaded with the same data as that contained in the memory under test. Address selection for the buffer memory 66 is provided via the line 16 which also provides the address to the memory 13 under test. When the EXT → T instruction is called, the word in the addressed location of the buffer memory 66 is transferred via the path 67 into the T-register 37. This facilitates subsequent comparison by the data comparator 40 between the word accessed from the buffer memory 66 (now in the T-register 37) and the corresponding word read from the memory 13 under test.

Figures 5A, 5C:
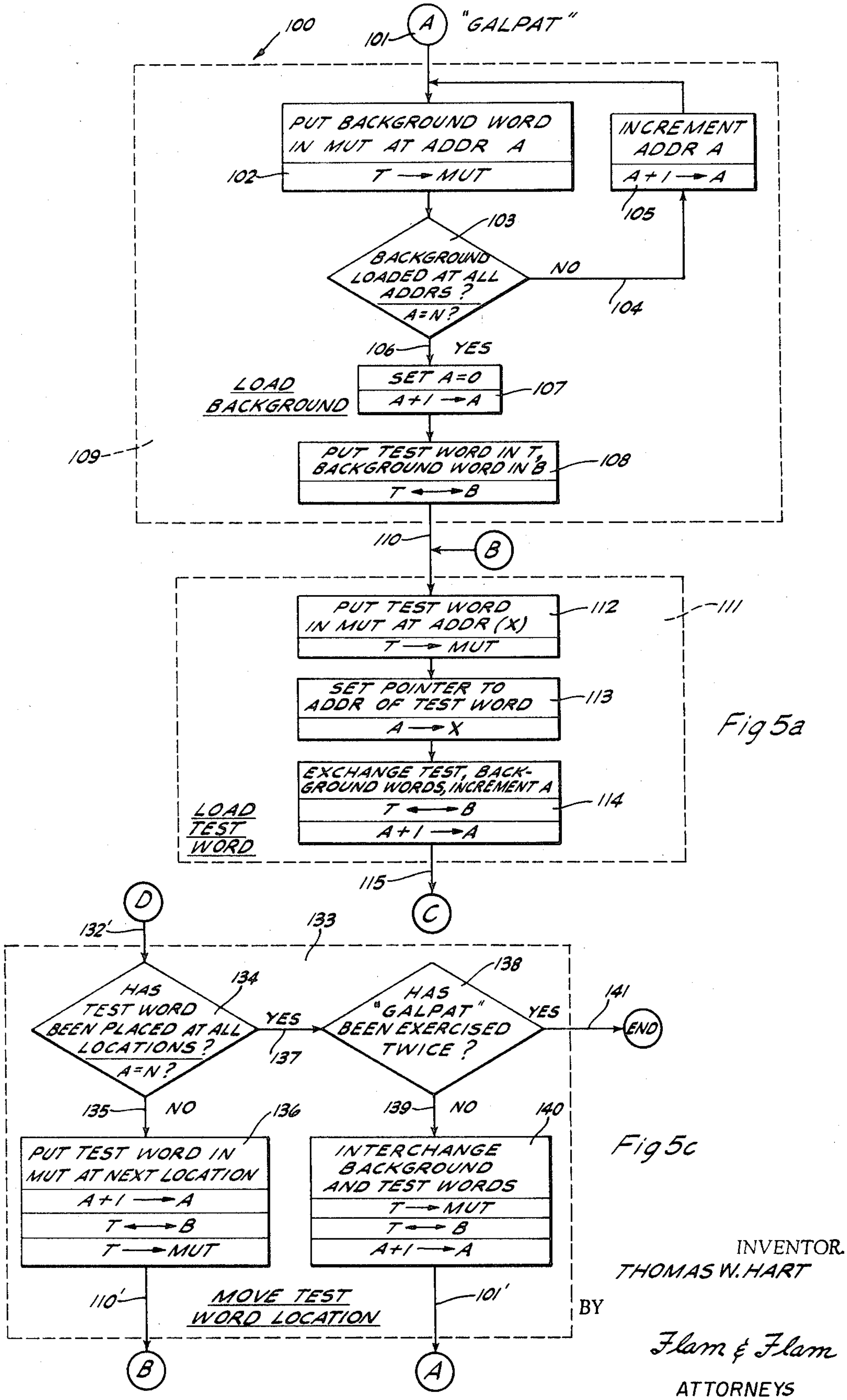

The B → B instruction (see Table II) maintains the contents of the B-register 38 unchanged. The T → B instruction causes contents of the T-register 37 to be loaded into the B-register 38. The T → B command may be combined in the same instruction word with another command involving the T-register 37. For example, if the instruction bits Z7, Z6, Z5, Z4 have the configuration 1011, the contents of the B-register 38 will be transferred to the T-register 37 and the previous contents of the T-register 37 will be transferred to the B-register 38. This interchange of data is indicated symbolically in FIG. 5*c* and elsewhere as T←→B.

The instruction T*2 → T directs shifting of the contents of the T-register 37. The shift instruction is carried out in conjunction with the control bits Z8 and Z9 of the instruction word, as modified by the bit Y7 of the Y-register 68 discussed below in conjunction with FIG. 4. The following Table III lists the possible shift modifications:

TABLE III

| Z9 | Z8 | When Y7=0 | When Y7=1 |
|---|---|---|---|
| 0 | 0 | $T_{15} \rightarrow T_0$ | $T_{15} \rightarrow B_{15}$ |
| 0 | 1 | $0 \rightarrow T_0$ | $B_0 \rightarrow T_0$ |
| 1 | 0 | $1 \rightarrow T_0$ | B-T register |
| 1 | 1 | Random $\rightarrow T_0$ | Circular Shift |

By way of example, when the instruction T*2 → T is commanded, and the bits Y7, Z8 and Z9 all are zero, the highest order bit $T_{15}$ in the T-register 37 is shifted directly back to the low order $T_0$ position of the same register. If Y7=1, a circular shift is executed via the path including T-register 37, the line 69, the B-register 38 and the line 70. The T-register 37 shifts to the left and the B-register 38 shifts to the right.

Figure 7A:
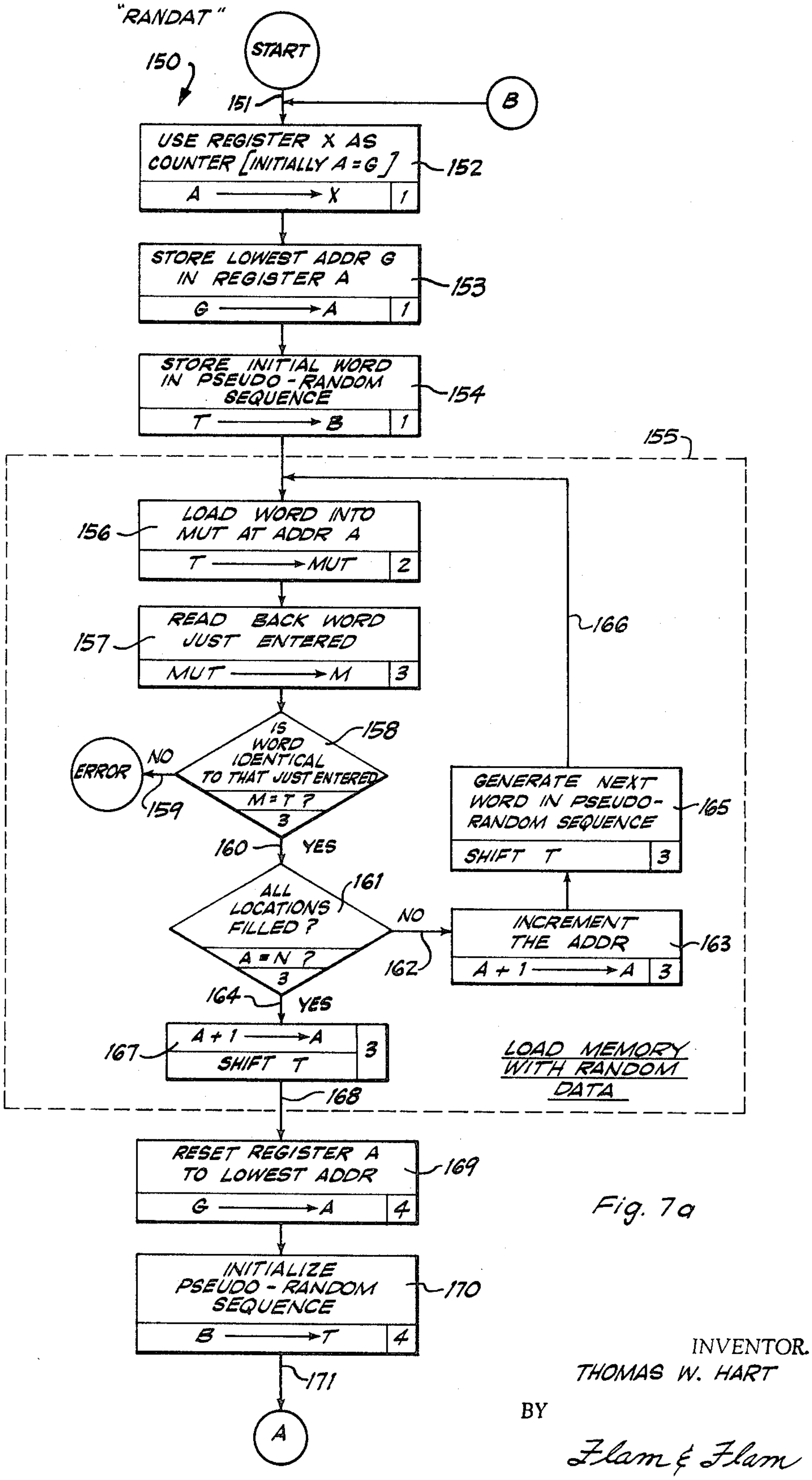
FIGS. 7*a* and 7*b* together comprise a flow chart of the random data "RANDAT" memory test program which may be performed by the exerciser of FIG. 1.
Figure 7B:
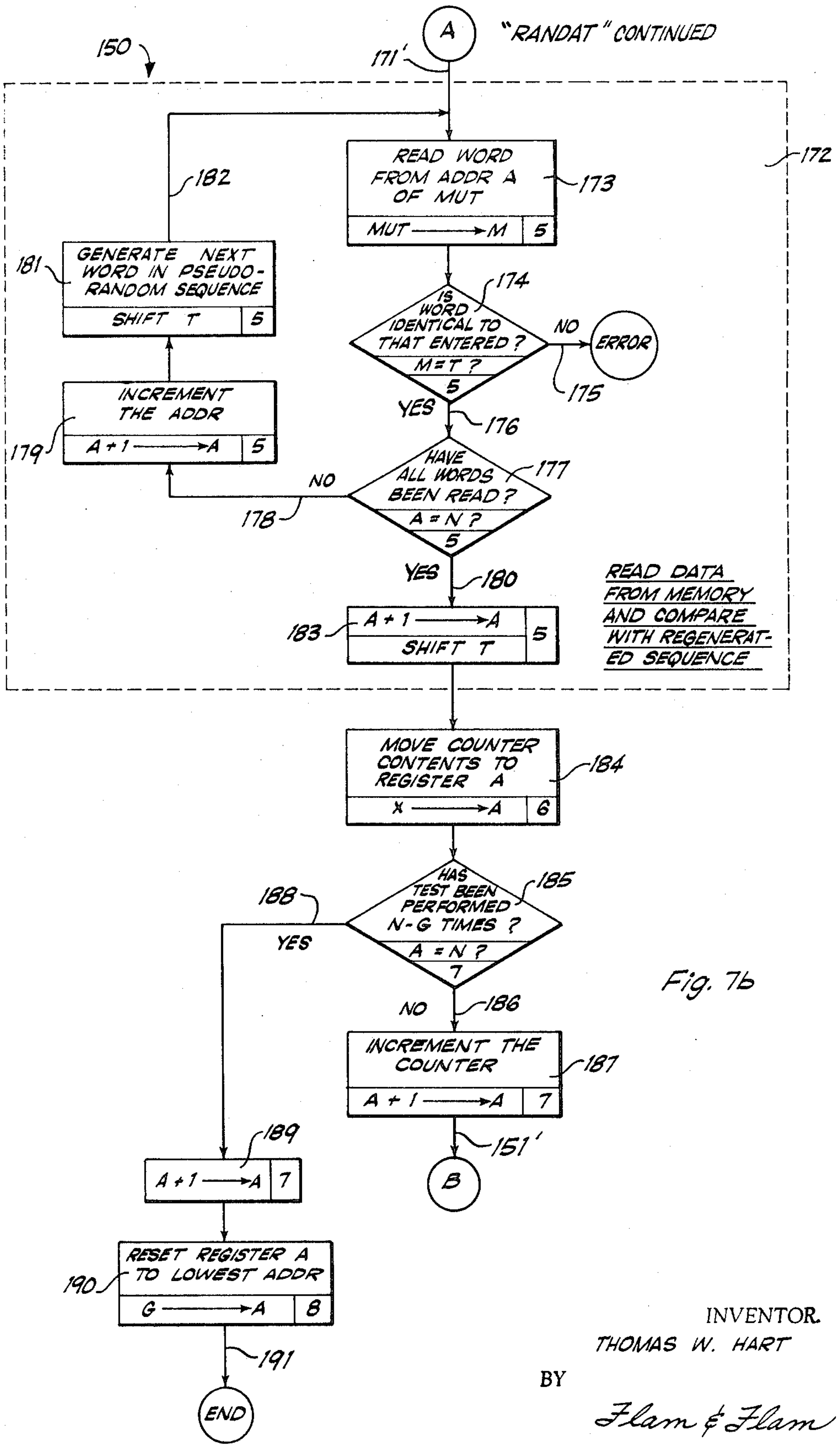

Pseudo-random sequence generation is commanded by the instruction T*2 → T with Y7=0 and Z8, Z9 = 1,1. In this case, various bit positions of the T-register 37 are connected via the path 71 to the shift count logic 72, the output of which is returned via the path 73 to the $T_0$ input of the T-register 37. The shift count logic 73 includes appropriate exclusive-or circuitry for producing in the T-register 37 consecutive different data words comprising a pseudo-random sequence. Such pseudo-random sequence generation is used, e.g., in the "RANDAT" program described below in conjunction with FIGS. 7*a* and 7*b*.

Data can be entered into any of the registers in the sections 11 or 15 by means of an S-register 74 (FIG. 3) which may be connected via a switch (not shown) to the selected register. The parity generator 75 may be utilized by the control section 17 via a line 76 for certain algorithmic generation of data and addressing patterns.

Figure 4:
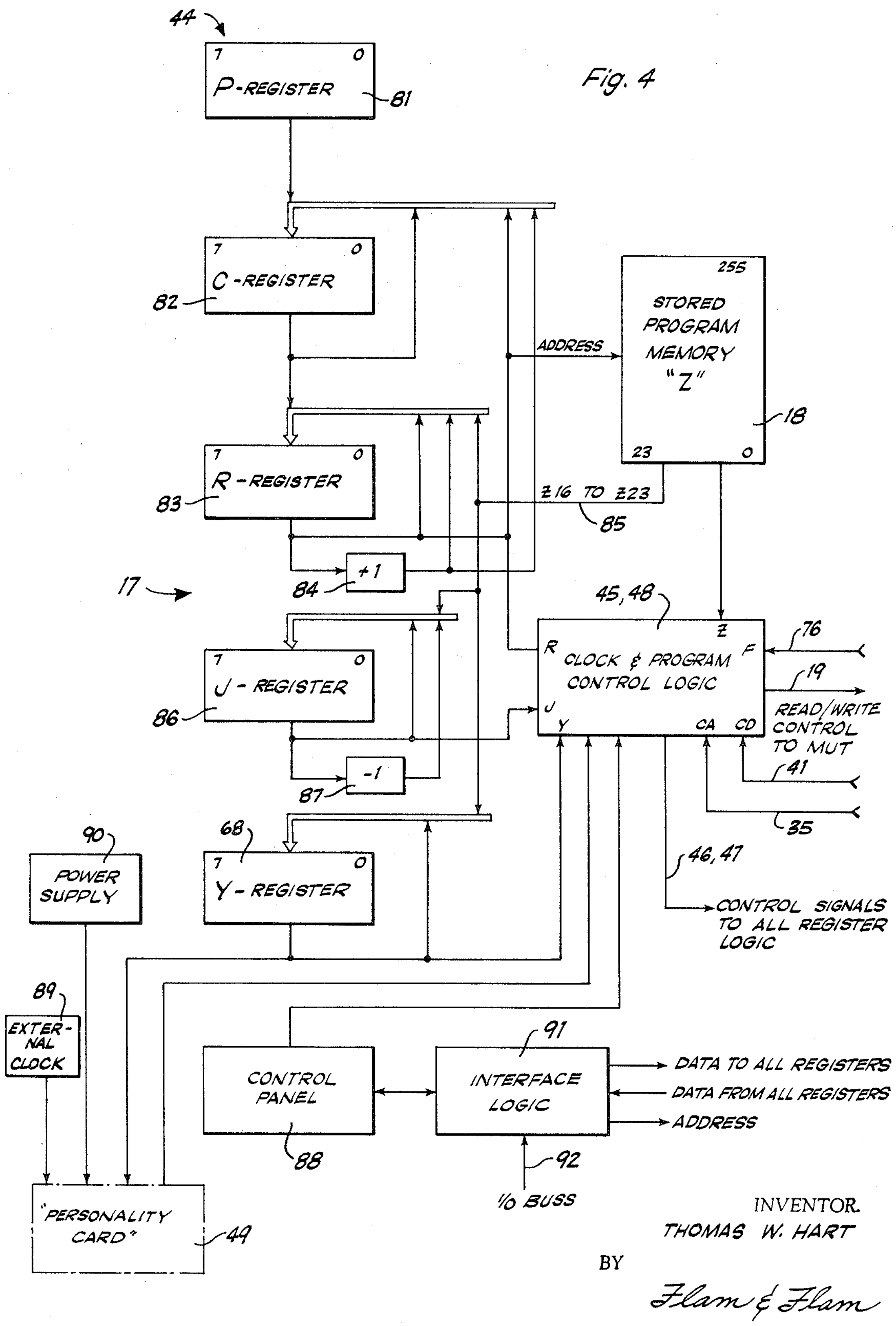
FIG. 4 is a block diagram of the command and control section of the memory system exerciser of FIG. 1.

Referring to FIG. 4, the command and control section 17 includes five program registers 44. The P-register 81 holds the starting location in the memory 18 of the test program to be performed by the exerciser 10. This starting location is loaded into the C-register 82 to initiate program operation. If a subroutine subsequently is called by the program, the C-register will store the address at which the main program is to be re-entered after execution of the subroutine.

The R-register 83 functions as the address register for the stored program memory 18. Thus the R-register 83 contains the address of the microinstruction currently being executed. Normally the address in the R-register 83 is incremented, by means of the add one circuit 84, each time an instruction is accessed from the memory 18. However, on jump instructions, the jump address contained in bits Z16 to Z23 of the executed instruction will be entered into the R-register 83, via the path 85. The J-register 86 stores a number indicating how many times an indexed instruction is to be repeated. This number is decremented by the subtract one circuit 87 for each repetition of the instruction.

As noted above, one bit (Y7) of the Y-register 68 is used as a T-register shift modifier. Other bits of the Y-register 68 are used for clock selection. For example, the bits Y5 and Y6 may determine whether the program control logic 45 operates at 3 Hz from the internal clock 48; at 5 mHz from the internal clcok 48; from an external clock signal supplied via the control panel 88, or from an external clock 89 connected via the "personality card" 49. The Y-register 68 also may enable an external power supply 90 connected via the "personality card" 49, and used to provide appropriate voltage levels to the memory 13 under test. The Y-register 68 may be tested and modified by various control instructions.

The control section 17 (FIG. 4) includes appropriate interface logic 91 which facilitates transfer of data between any register in the exerciser 10 and an external computer (not shown) or other test equipment. Thus the exerciser 10 may be integrated as a component of a larger test system, with appropriate data and command interface occurring via the I/O buss 92.

The Table IV below lists certain of the command and control instructions utilized by the memory system exerciser 10.

A-register 30 do not equal the contents of the N-register 32, then the next instruction is accessed from the jump address (bits Z16 through Z23) which is placed in the memory address R-register 83. If the contents of the A- and N-registers 30,32 are equal, the R-register 83 is incremented and the next consecutive instruction is executed Similarly, the conditional instruction Jump if $A \neq X$ involves comparison of the address in the A-register 30 and the X-register 32. If the contents are not equal, then the jump address (bits Z16 through Z23) is loaded into the R-register 83; if $A = X$, then the R-register 83 is incremented.

Two jump instructions are conditioned by the data comparison (CD) signal. Thus the Jump if $T \neq M$ instruction causes the program to branch to the address specified by bits Z16 through Z23 if the contents of the T-register 37 differ from the contents of the M-register 39. If $T = M$, no jump occurs, and the R-register 83 is incremented as usual. Similarly, for the conditional instruction jump if $T \neq B$, the contents of the T-register 37 is compared with the contents of the B-register 38. If $T \neq B$, the program jumps to the specified address; if $T = B$, no jump occurs.

For certain programs, it may be advantageous to condition a jump on both an address and a data comparison; two double conditional jumps are available for this purpose. Thus the instruction Jump on $A \neq N$ if $T = M$ has the following action. If $A \neq N$ and $T \neq M$, the program jumps to memory address zero (zero is en-

TABLE IV

| Op. code | | | | | | |
|---|---|---|---|---|---|---|
| Z12 | Z11 | Z10 | Z9 | Z8 | Instruction | Action |
| 0 | 0 | 0 | 0 | 0 | Jump to Subroutine J times | |
| 0 | 0 | 0 | 0 | 1 | do | If $J=0$, $R+1 \rightarrow R$, otherwise $R \rightarrow C$ $Z \rightarrow R$ This instruction is executed $J+1$ times. |
| 0 | 0 | 0 | 1 | 0 | do | |
| 0 | 0 | 0 | 1 | 1 | do | |
| 0 | 0 | 1 | 0 | 0 | Set Index Register J | $Z \rightarrow J$ $R+1 \rightarrow R$. |
| 0 | 0 | 1 | 0 | 1 | Spare | |
| 0 | 0 | 1 | 1 | 0 | Set Register Y | $Z \rightarrow J$ $R+1 \rightarrow R$. |
| 0 | 0 | 1 | 1 | 1 | Spare | |
| 0 | 1 | 0 | 0 | 0 | No Operation | $R+1 \rightarrow R$. |
| 0 | 1 | 0 | 0 | 1 | Spare | |
| 0 | 1 | 0 | 1 | 0 | Jump to Subroutine | $Z \rightarrow R$ $R+1 \rightarrow C$. |
| 0 | 1 | 0 | 1 | 1 | Return From Subroutine | $C \rightarrow R$ $P \rightarrow C$. |
| 0 | 1 | 1 | 0 | 0 | Jump if F0 (A register parity even) | If $F0=1$, $Z \rightarrow R$; If $F0=0$ $R+1 \rightarrow R$. |
| 0 | 1 | 1 | 0 | 1 | Spare | |
| 0 | 1 | 1 | 1 | 0 | Test and Decrement Y jump if $Y \neq 0$ | If $Y \neq 0$ $Z \rightarrow R$ $Y-1 \rightarrow Y$; if $Y=0$ $R+1 \rightarrow R$ $Y-1 \rightarrow Y$. |
| 0 | 1 | 1 | 1 | 1 | Spare | |
| 1 | 0 | 0 | 0 | 0 | Unconditional Jump | $Z \rightarrow R$. |
| 1 | 0 | 0 | 0 | 1 | Jump if $J=0$ | If $J=0$, $Z \rightarrow R$; If $J \neq 0$, $R+1 \rightarrow R$. |
| 1 | 0 | 0 | 1 | 0 | Jump if $A=X$ | If $A=X$ $Z \rightarrow R$; If $A \neq X$ $R+1 \rightarrow R$. |
| 1 | 0 | 0 | 1 | 1 | Jump if $A=N$ | If $A=N$, $Z \rightarrow R$; If $A \neq N$, $R+1 \rightarrow R$. |
| 1 | 0 | 1 | 0 | 0 | Indexed instruction | |
| 1 | 0 | 1 | 0 | 1 | do (Repeats $J+1$ times.) | $Z \rightarrow J$ $J-1 \rightarrow J$ and when $J=1$ or $Z=0$, $R+1 \rightarrow R$ $0 \rightarrow J$. |
| 1 | 0 | 1 | 1 | 0 | do | |
| 1 | 0 | 1 | 1 | 1 | do | |
| 1 | 1 | 0 | 0 | 0 | Jump if $A \neq X$ | If $A \neq X$ $Z \rightarrow R$; If $A=X$ $R+1 \rightarrow R$. |
| 1 | 1 | 0 | 0 | 1 | Jump if $A \neq N$ | If $A \neq N$, $Z \rightarrow R$; If $A=N$, $R+1 \rightarrow R$. |
| 1 | 1 | 0 | 1 | 0 | Double Conditional Jump | If $T \neq M$, $R \rightarrow C$ $0 \rightarrow R$; If $A \neq X$ then $Z \rightarrow R$; otherwise $R+1 \rightarrow R$. |
| 1 | 1 | 0 | 1 | 1 | do | If $T \neq M$ then $R \rightarrow C$ $0 \rightarrow R$; If $A \neq N$ then $Z \rightarrow R$; otherwise $R+1 \rightarrow R$. |
| 1 | 1 | 1 | 0 | 0 | Jump if $T \neq B$ | If $T \neq B$ $Z \rightarrow R$; If $T=B$ $R+1 \rightarrow R$. |
| 1 | 1 | 1 | 0 | 1 | Jump if $T \neq M$ | If $T \neq M$ $Z \rightarrow R$; If $T=M$ $R+1 \rightarrow R$. |
| 1 | 1 | 1 | 1 | 0 | Spare | |
| 1 | 1 | 1 | 1 | 1 | do | |

The Unconditional Jump causes the address stored in bits Z16 through Z23 of the instruction word to be entered into the R-register 83. As a result, the next stored program instruction is accessed from this new R-register 83 address.

Two jump instructions are conditioned by the address comparison (CA) signal. The Jump if $A \neq N$ instruction has the following action. If the contents of the tered into the R-register 83) to indicate that an error has been detected. The point in the program at which termination occurred is saved by loading the previous contents of the R-register 83 into the C-register 82. If the contents of the T- and M-registers 37, 39 are equal, but $A \neq N$, the program jumps to the address specified by the index field of the instruction. If $T = M$ and $A = N$, no jump occurs, and the R-register 83 is incremented to address the next sequential instruction. The other double conditional instruction is Jump on A ≠ X if T = M. Action is the same as the foregoing instruction, except that the address in the A-register 30 is compared with the pointer address in the X-register 33.

The bits Z13, Z14, Z15 of the micro-instruction word are used to initiate memory commands. Thus if bit Z13 is a binary one, a write command (T → MUT) is transmitted via the line 19 to the memory 13 under test. If the bit Z14 is set to a binary one, a memory read command (MUT → M) is initiated. The bit Z15, if set to a binary one, initiates a memory cycle command which may be used in conjunction with the "personality card" 49 to satisfy the special clocking requirements of certain memories to be tested.

The manner in which the various micro-instruction words may be combined to form a program for exercising a memory 13 under test is illustrated by the "GALPAT", "RANDAT" and "WALKPAT" routines described below.

Shown in FIGS. *5a*, *5b* and *5c* is a galloping pattern program 100, herein designated "GALPAT", which will exercise all cells in the memory 13 under test. The program tests the addressing, the interaction between bits, and pattern and sequence dependency for transient performance.

Each step of the "GALPAT" program 100 is described below, with specific reference to the instructions executed by the memory system exerciser 10. Before executing the program, a test word (for example, all binary ones) is placed in the B-register 38, and a background word (e.g., all binary zeros) is placed in the T-register 37. The I-register 42 is appropriately set to define the word length of the memory 13 under test. The lowest and highest addresses of the memory 13 under test are loaded respectively into the G-register 31 and the N-register 32. The lowest memory address G also is entered in the A-register 30. The "GALPAT" program 100 is entered via the path 101 to the block 102.

Block 102 - A memory write command (T → MUT) is executed to enter the background word into the memory 13 at the address specified by the A-register 30. During the intial entry to the block 102, the background word will be entered at the lowest memory address G, which for this program is zero.

Block 103 - A test is made to determine if the background word has been loaded into all storage locations of the memory under test. This is accomplished using a conditional jump if A ≠ N instruction. If some locations still must be loaded (A ≠ N), the exit path 104 is taken to the block 105. If the entire memory has been filled with the background word, the exit path 106 is taken to the block 107.

Block 105 - The A-register 30 is incremented (A+1 → A) and the program returns to the block 102 to enter the background word at the next location.

Block 107 - The A-register 30 address again is set to zero. Since this block is entered when A = N, resetting of the A-register 30 to zero may be accomplished by performing an increment A operation (A+1 → A).

Block 108 - The contents of the T- and B-registers 37, 38 are interchanged to place the test word in the T-register 37 and the background word in the B-register 38. The blocks 102 through 108 together comprise a loop 109 which loads the background word into all positions of the memory 13 under test. The loop 109 is exited via the path 110 to the routine 111 which loads the test word into a single memory 13 storage location.

Block 112 - A write (T → MUT) operation is performed to enter the test word now in the T-register 37 into the single location specified by the contents of the A-register 30.

Block 113 - The location of the test word now is stored (A → X) as a pointer in the X-register 33.

Block 114 - The contents of the T- and B-registers 37, 38 are interchanged again to place the background word in the T-register 37. The A-register 30 is incremented, and the block is exited via the path 115, 115' to the block 116 (FIG. 5b). Data is read from the memory 13 in the order (1) background word, (2) test word, (3) background word, as discussed below in conjunction with FIG. 6.

Blocks 116 and 117 - The background word is read out from the memory 13 location specified by the A-register 30. The data read out is compared to the background word originally entered, and now contained in the T-register 37. If the words are not identical, a memory 13 error has occurred and the exit path 118 is taken to indicate this error. If the background word is read out correctly, the exit path 119 is taken to the block 120.

Blocks 120 and 121 - The test word now is read out from the single memory 13 location identified by the pointer in the X-register 33, and compared with the test word originally entered. If an error is detected, the exit path 122 is taken, if not, block 122 is exited via the path 123 to the block 124.

Blocks 124 and 125 - The same background word read out at the blocks 116 and 117 above is accessed once again, and again compared with the background word originally entered. This repeated operation insures that data in the accessed memory 13 location has not been effected adversely by the preceding read out (block 120) of the test word. If the stored data has changed, the exit path 126 is taken to indicate an error. If correct read out occurs, the path 127 is taken to the block 128.

Block 128 - The A-register is incremented to facilitate read out of the next memory location storing a background word.

Block 129 - A test is made to determine if the background word has been read from all locations in the memory 13 under test. If not, the path 130 is taken back to the block 116, and the next background word location is tested. Thus the iterative read out loop 131 "gallops" through the memory 13 under test. The loop 131 is exited via the path 132, 132' to the routine 133 (FIG. 5) which moves the test word location.

Block 134 - Has the test word been entered in all locations of the memory 13 under test? If not, the exit path 135 is taken to the block 136; if so, the path 137 is taken to the block 138.

Block 136 - The background word now is entered into the memory position previously storing the test word. The block is exited via the path 110′, 110 back to the block 112 where the test word is entered into the next storage location of the memory 13 under test.

Block 138 - The test is made to determine whether the "GALPAT" program 100 has been executed twice. If not, the path 139 is taken to the block 140; if so, the program is exited via the path 141.

Block 140 - The background and test words now are interchanged, and the path 101′, 101 is followed back to the beginning of the "GALPAT" program. It is advantageous to perform the "GALPAT" program twice, interchanging the background and test words for the second execution, to insure that the test results are not dependent upon the specific data selected for the test word.

FIG. 6 illustrates the order in which data is read out by the loop 131 when performing the "GALPAT" test program on a memory 13′ (FIG. 2) containing four words $A_0$ through $A_3$. Initially, the test word is entered at address $A_0$, and the background word written at all other addresses. On the first pass through the loop 131, the addresses $A_1$, $A_0$ and $A_1$ will be read out, as indicated by the line 145 in FIG. 6. During the second iteration of the loop 131, the addresses $A_2$, $A_0A_2$ will be accessed (see the line 146). This will be followed by readout of the addresses $A_3$, $A_0$, $A_3$ (line 147). The routine 133 (FIG. 5C) then will be executed to move the test word to the next address $A_1$. The loop 131 will be entered again to read out the locations $A_2$, $A_1$, $A_2$, etc.

Illustrated in FIGS. *7a* and *7b* is a random data write and read program 150, herein referred to as "RANDAT". This subroutine writes and reads pseudo-random data, which may turn up pattern dependency in the memory 13 under test. The program is entered at path 151, with the initial requirement that the A-register 30 contain the lowest memory address G.

Block 152 - The lowest memory address is stored in the X-register 33, used as a counter by the "RANDAT" program.

Block 153 - The lowest address G is restored in the A-register 30 when the block is reentered via the path 151′.

Block 154 - The initial word of the pseudo-random sequence is stored in the B-register 38. A single micro-instruction word (word 1) includes all three instructions (A → X, G → A T → B) required to execute the blocks 152, 153 and 154. The entire memory 13 under test next is loaded with pseudo-random data by the iterative loop 155, beginning at the block 156.

Blocks 156, 157 and 158 - One word in the pseudo-random sequence is entered into the memory 13 at the address specified by the A-register 130. The word entered immediately is read back and tested to insure correct entry. If erroneous entry has occurred, the path 159 is taken to indicate such error. If the word is correctly entered, the path 160 is taken to the block 161.

Block 161 - Have all locations in the memory 13 been filled with data? If not, the path 162 is taken to the block 163; if so, the path 164 is taken to the block 167.

Blocks 163 and 165 - The A-register 30 address is incremented, and the next word in the pseudo-random sequence is generated using the random shift operation described in conjunction with FIG. 3 above. The path 166 is taken back to the block 156 to load the new pseudo-random word into the next memory location.

The blocks 157, 158, 161, 163 and 165 all are implemented with a single micro-instruction word (word 3) including a read command, a double conditional jump, an increment A instruction, and a shift T instruction. When the block 161 is exited via the path 164, incrementing of the A-register 33 and random shifting of the T-register 37 both occur (block 167), but are not required. The loop 155 is exited via the path 168 to the block 169.

Blocks 169 and 170 - The A-register 33 again is reset to the lowest address G, and the first word in the pseudo-random sequence generated by the loop 155 (and earlier stored at block 154 in the B-register 38) is replaced into the T-register 37 to initialize regeneration of the same pseudo-random sequence. Block 170 is exited via the path 171, 171′ to the loop 172 (FIG. *7b*) which reads out data from all locations of the memory 13 under test, and compares this data with the regenerated pseudo-random sequence.

Blocks 173 and 174 - A word is read from the memory 13 and compared with the regenerated word originally entered at that address. If the words differ, the error exit 175 is followed. If the correct data is read, the path 176 is taken to the block 177.

Block 177 - Have all words been read from the memory 13? If not, the path 178 is followed to the block 179; if so, the path 180 is followed to the block 183.

Blocks 179 and 181 - The A-register 30 address is incremented, and the next word in the pseudo-random sequence is regenerated. As noted, the pseudo-random sequence generated by read out loop 172 will be identical to that generated during the load loop 155. The exit from the block 181 is via the path 182 back to the block 173.

The entire loop 172 is implemented with a single micro-instruction word (word 5). Appropriate fields of this word direct data readout (MUT → M), data comparison (M=T?), address comparison (A=N?), address incrementing (A+1 → A) and data generation (random shift T). The block 183, including address incrementing and data shifting, is executed when the loop exit path 180 is followed, but is not necessary to program operation.

Blocks 184 and 185 - Has the "RANDAT" program been performed a number of times equal to the number of words (N-G) in the memory 13 under test? This test is accomplished by transferring the contents of the X-register 33, used herein as a counter, into the A-register 30, for comparison with the highest memory address N. If the "RANDAT" program 150 has not been performed the requisite number of times, the path 186 is taken to the block 187, the counter is incremented, and the path 151′, 151 is followed back to the block 152. When the "RANDAT" program 150 has been performed N-G times, the path 188 is taken via the block 189 (A+1 → A) and the block 190 (which resets the A-register to G) to the program exit 191.

Figure 8A:
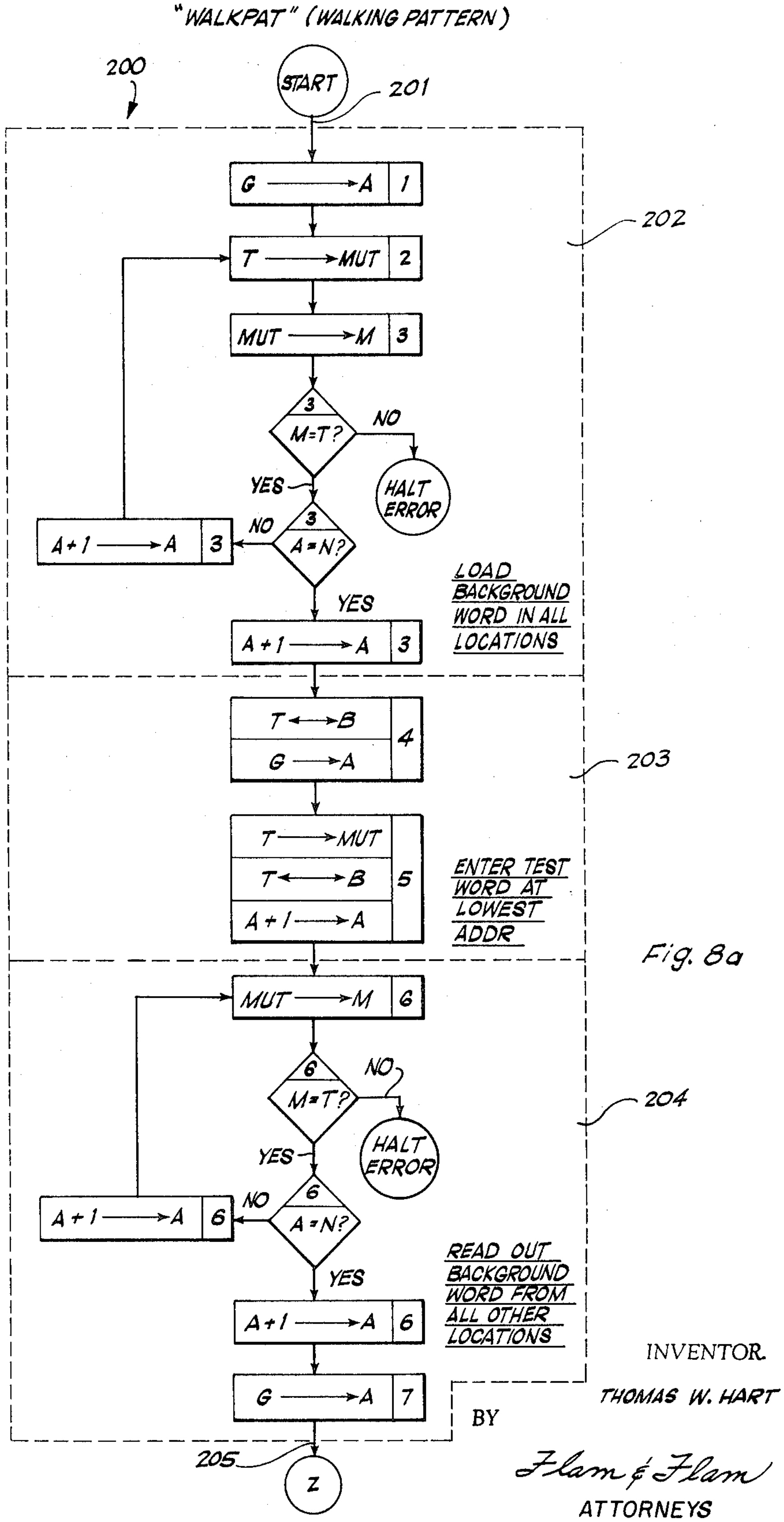
FIGS. 8*a* and 8*b* together comprise a flow chart of the walking pattern "WALKPAT" memory test program which may be performed by the exerciser of FIG. 1.
Figure 8B:
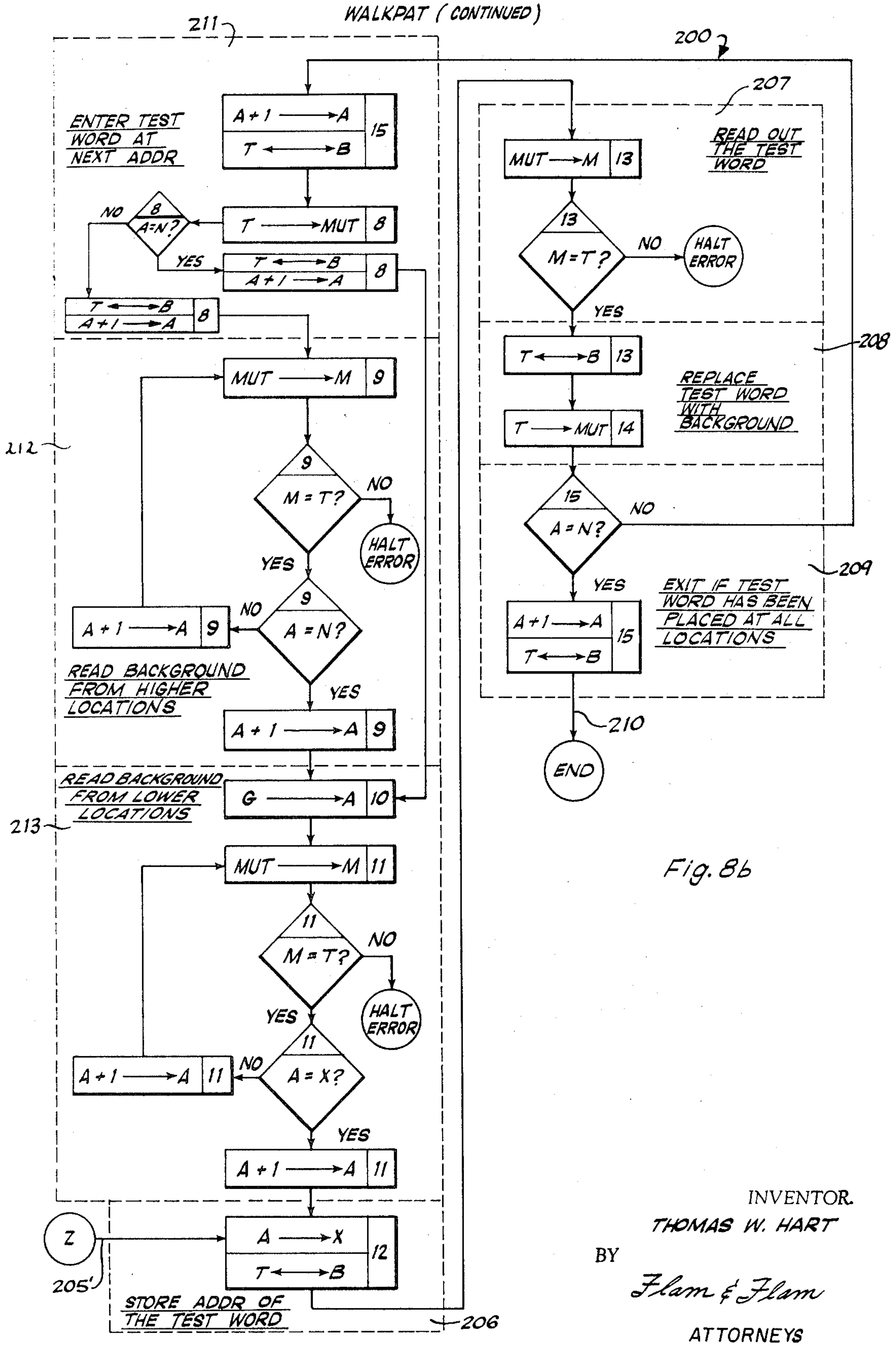

The FIGS. 8*a* and 8*b* illustrate a walking pattern program 200, herein designated "WALKPAT". This is a general purpose semiconductor memory test program which will test all bit storage cells in the array, the memory addressing and the interaction between bits.

The "WALKPAT" program 200 is entered via the path 201 to the block 202, wherein a background word (initially stored in the T-register 37) is loaded into all locations of the memory 13 under test. At the block 203, a test word (initially stored in the B-register 38) is entered at the lowest address G of the memory 13. The background word then is read out (block 204) sequentially from all other memory 13 locations, and verified to be identical to the word originally stored.

From the block 204, the path 205, 205' is taken to the block 206. The memory 13 address at which the test word is stored is entered into the X-register 33. The test word itself then is read out from the memory 13 (block 207) and verified to be correct. The background word then is written (block 208) into the memory 13 storage location previously containing the test word.

If the test word now has been placed at all memory 13 storage locations (as determined by the block 209), the "WALKPAT" program is exited via the path 210. If not, the test word is entered (block 211) at the next memory 13 location. The background word then is read from all other memory locations. At the block 212, the background word is read from locations having addresses higher than that of the test word location, followed by readout (block 213) of the background word from the lower locations. When this readout is complete, the program branches back to the block 206.

In FIGS. 8a and 8b, the various micro-instruction words comprising the "WALKPAT" program 200 are set forth symbolically, together with a number indicating the instruction sequence of the program. There are 15 instruction words in the "WALKPAT" program. In several instances, memory read/write control, address comparison, data comparison, and address generation all are controlled by a single instruction. This is typified, e.g., by instruction word 6 in the read out background loop 204.

The various programs described thus illustrate the significant flexibility of the inventive memory system exerciser 10. This flexibility is achieved by utilizing data generation and address generation means wherein memory addressing and data production are performed independent under direction of control means executing program instructions wherein different fields designate simultaneous data, address, control and memory read/write operations.

The applicant intends to claim all novel, useful and unobvious features shown or described. Accordingly, applicant reserves the right to amend these claims and/or to present new claims in this or any proper reissue application.

I claim:

1. A system for exercising a memory under test, comprising:

address generation means for addressing data storage locations in said memory under test, data generation means for providing data to be entered into said memory under test and for receiving data read from said memory under test, control means operatively connected to said address and data generation means for commanding, under program control, entry of data into addressed locations of said memory under test, said control means comprising;

a stored program memory containing a set of instructions, and program control logic for providing commands which direct said address and data generation means independently and selectively to modify said data to be entered and/or said addressed storage locations in accordance with instructions accessed from said stored program memory.

2. A system according to claim 1 wherein said data generation means includes a T-register for storing a test word for entry into said memory under test.

3. A system according to claim 2 wherein said data generation means further comprises logic circuitry, operatively connected to said T-register and under program control, for modifying the contents of said T-register.

4. A system according to claim 2 wherein said data generation means includes a B-register for storing another data word, and wherein said control means may command transfer or comparison of data between said B-register and said T-register under stored program control.

5. A system according to claim 2 wherein said data generation means further comprises means, under program control, for feedback shifting said T-register to generate a pseudo-random data sequence.

6. A system according to claim 1 wherein said control means also commands readout of data from addressed locations of said memory under test.

7. A system according to claim 6 wherein said data generation means further comprises a data comparator for comparing data read out from said memory under test with data provided thereto and for supplying to said control means a data comparison signal indicative of the results of said comparison.

8. A system according to claim 7 wherein said stored program includes one or more instructions conditioned by the status of said data comparison signal.

9. A system according to claim 7 wherein said data generation means further comprises a T-register containing data to be entered into said memory under test and an M-register receiving data from said memory under test, said comparator comparing the contents of said T-register and said M-register.

10. A system according to claim 9 wherein said data generation means further comprises an I-register operatively connected to said comparator, to inhibit comparison of those portions of said T-register and M-register contents specified by the contents of said I-register.

11. A system according to claim 1 wherein said address generation means comprises an A-register storing the address of the memory storage location to which data is to be entered or from which data is to be read out.

12. A system for exercising a memory under test, comprising:

address generation means for addressing data storage locations in said memory under test, and comprising an A-register storing the address of the memory storage location to which data is to be entered or from which data is to be read out, and logic circuitry, operatively connected to said A-register and under program control, for modifying the contents of said A-register, data generation means for providing data to be entered into said memory under test and for receiving data read from said memory under test, and control means operatively connected to said address and data generation means for commanding, under program control, entry of data into addressed locations of said memory under test.

13. A system according to claim 12 wherein said address generation means further comprises an address comparator for comparing the address in said A-register with another address and for supplying to said control means an address comparison signal indicative of the results of said comparison.

14. A system according to claim 13 wherein said address generation means further comprises an N-register for storing the address of the highest data storage location in said memory under test, and wherein said other address corresponds to the contents of said N-register.

15. A system according to claim 13 wherein said address generation means further comprises an X-register for storing a pointer address, and wherein said other address corresponds to said pointer address.

16. A system according to claim 13 wherein said stored program includes one or more instructions conditioned by the status of said address comparison signal.

17. A system for exercising a memory under test in response to programmed commands supplied by a processor, comprising:

first register means for storing data to be entered into said memory, first logic means for modifying the contents of said first register means in response to certain of said commands, second register means for storing the address of a memory storage location, second logic means for modifying the contents of said second register means in response to other of said commands, and means for entering said data stored in said first register means into the memory storage location identified by the address in said second register means in response to a write command supplied by said processor.

18. A system according to claim 17 further comprising:

third register means for receiving data read from said memory, and means for reading data from the memory storage location identified by the address in said second register means into said third register means in response to a read command.

19. A system according to claim 18 further comprising:

data comparator means for comparing the data received by said third register means with the data originally entered into the memory storage location from which said received data was read, said data comparator means providing a data comparison signal to said processor indicative of the results of said comparison.

20. A system according to claim 19 further comprising:

additional register means for storing the address of the lowest memory storage location, the highest memory storage location or another specified memory storage location, and address comparator means for comparing the address stored by said second register means with an address stored by said additional register means, said address comparator means providing an address comparison signal to said processor indicative of the results of said comparison.

21. A system according to claim 20 wherein certain of said programmed commands are conditioned by said data comparison signal or said address comparison signal.

22. A processor for providing programmed commands to the system of claim 17, comprising:

a stored program memory containing a set of instructions specifying a program for exercising said memory under test, program register means for directing access from said program control memory of the instructions in said set, and program control logic means for interpreting said accessed instructions and for providing to said system the commands specified by said instructions.

23. A processor according to claim 22 wherein each instruction contains a first field controlling data generation by said first register means and said first logic means and a second field controlling address generation by said second register means and said second logic means.

24. In a computer directed system for testing a memory device:

a first means for loading a background word into all locations of said memory under test, a second means for entering a test word at a single location in said memory, and a third means for reading out each memory location storing said background word in alternation with readout of said single location storing said test word, and for indicating an error when incorrect data is read from any location.

25. A system according to claim 24 further comprising:

fourth means for directing said second and third means to operate repeatedly a number of times equal to the number of storage locations in said memory under test, said second means entering said test word in a different single location during each repetition.

26. A system according to claim 25, wherein said first through fourth means operate twice, said background word being interchanged with said test word during said second operation.

27. A system according to claim 24 wherein said thrid means reads out from memory location storing said background word twice, one before and once after said alternate readout of said single location.

28. In a computer directed system for testing a memory device:

a first means for entering a background word into all locations of said memory under test, a second means for entering a test word at a single location in said memory, a third means for reading back all other memory locations except said single location and for indicating an error if the data read back from any such location differs from said background word.

29. A system according to claim 28 further comprising fourth means for directing said second and third means to operate repeatedly a number of times equal to the number of storage locations in said memory under test, said second means entering said test word in a different single location during each repetition, said first means entering said background word in said previous single location to replace said test word.

30. A system according to claim 29 wherein during each repetition said third means consecutively reads out the memory locations having addresses both lower than and higher than said single location.

31. A system according to claim 29 wherein said first through fourth means operate twice, said background word being interchanged with said test word during said second operation.

32. In a computer directed memory exercise system:

a first means for generating a pseudo-random data sequence and for entering data in said sequence into locations of a memory under test, and a second means, operative upon completion of data entry, for regenerating said same pseudo-random data sequence while reading out said entered data from said memory, and for indicating an error should said read out data differ from said regenerated sequence.

33. A system according to claim 32 further comprising third means for directing said first and second means to operate respectively a number of times equal to the number of storage locations in said memory under test, a different pseudo-random data sequence being generated during each repetition.

34. A memory exerciser comprising:

program control means for storing and interpreting a set of instruction words each designating one or more selected memory exercise operations selected from the group consisting of data generation, address generation, memory read/write control, data comparison and address comparison, and memory exercise means, operatively connected to said program control means, for selectively addressing and exercising said memory as designated by said interpreted instruction words, and for modifying data supplied to said memory during exercise thereof in accordance with interpreted data generation instruction words.

35. A memory system exerciser according to claim 34 wherein each instruction word contains a field allocated to data generation, address generation,memory read/write control and data or address comparison.

36. A memory system exerciser comprising:

program control means for interpreting a set of instruction words each designating one or more selected memory system exercise operations selected from the group consisting of data generation, address generation, memory read/write control, data comparison and address comparison, memory exercise means, operatively connected to said program control means, for selectively addressing and exercising said memory system as designated by said interpreted instruction words, said memory exercise means including a data generation section comprising:

test word register means containing data to be written to, or compared with data read from, an addressed storage location of said memory system, and data modification means for modifying the contents of said test word register means in response to data generation operations designated by said instruction words.

37. A memory system exerciser according to claim 36 wherein data contained in said test word register means is written to said addressed storage location in response to a memory write operation designated by an interpreted instruction word.

38. A memory system exerciser according to claim 36 wherein said data generation section further comprises:

data comparator means for comparing data read from said memory system with data contained in said test word register means, and wherein interpretation by said program control means of an instruction word designating a data comparison operation is conditioned by the results of comparison in said data comparator means.

39. A memory system exerciser according to claim 38 wherein data is read from said addressed storage location in response to a read operation designated by an interpreted instruction word.

40. A memory system exerciser according to claim 34 wherein said memory exerciser means includes an address generation section comprising:

address word register means containing the address of a memory system storage location to which data is to be written or from which data is to be read, and address modification means for modifying the contents of said address word register means in response to address generation operations designated by said instruction words.

41. A memory system exerciser according to claim 40 wherein said address generation section further comprises:

at least one other address-containing register, address comparator means for comparing the address contained in said address word register means with the address stored in one of said other address-containing registers, and wherein interpretation by said program control means of an instruction word designating an address comparison operation is conditioned by the results of comparison in said address comparator means.

42. A memory system exerciser according to claim 41 wherein said one or more address-containing registers respectively store a pointer address, the lowest address of said memory system, and the highest address of said memory system.

43. A memory system exerciser according to claim 40 wherein said memory exercise means further includes a data generation section comprising:

test word register means containing data to be written to, or compared with data read from, the memory system storage location specified by the address contained in said address word register means, and data modification means for modifying the contents of said test word register means in response to data generation operations designated by said instruction words.

* * * * *